United States Patent [19]

Hahn

[11] Patent Number: 5,070,908

[45] Date of Patent: Dec. 10, 1991

[54] VACUUM VALVE

[75] Inventor: Sangman Hahn, Carmel, Ind.

[73] Assignee: Delco Electronics Corporation, Kokomo, Ind.

[21] Appl. No.: 665,043

[22] Filed: Mar. 6, 1991

[51] Int. Cl.⁵ .............................................. F16K 11/06
[52] U.S. Cl. ................................ 137/625.25; 251/176; 137/353
[58] Field of Search ..................... 137/625.25, 625.48, 137/625.21, 353; 251/176

[56] References Cited

U.S. PATENT DOCUMENTS

| 2,889,569 | 6/1959 | Riester | 251/176 X |
| 4,291,725 | 9/1981 | Raab | 137/625.25 |
| 4,448,390 | 5/1984 | Halstead | 251/176 |

Primary Examiner—Alan Cohan
Attorney, Agent, or Firm—Ronald L. Phillips

[57] ABSTRACT

A vacuum valve having a compliable selector plate.

3 Claims, 2 Drawing Sheets ns.
VACUUM VALVE

TECHNICAL FIELD

This invention relates to vacuum valves (vacuum switches) and more particularly to those where there are molded plastic stator and carrier parts and an elastomeric selector plate forming the valve assembly.

BACKGROUND OF THE INVENTION

In vacuum valves such as those used in motor vehicle heating, ventilating and air conditioning systems where the stator and carrier are molded plastic parts and the selector plate is an elastomeric (rubber) part, the vacuum pulling the selector plate against the stator may not be sufficient to effect proper sealing between these parts when the stator and/or the carrier are warped in their molding process. As a result, a spring is normally positioned between the carrier and the holder that holds the valve assembly together to force the selector plate to seal against the stator surface when the latter and/or the carrier are warped. Moreover, this spring force is normally made high enough to prevent the selector plate from carrier plate induced tipping that would also break its sealing contact with the stator. But such high spring force also has the affect of inhibiting selector plate movement thus requiring greater force by the operator or a servo to move the carrier.

SUMMARY OF THE INVENTION

The present invention eliminates the need for such a spring by simply forming a plurality of bumps that extend outwardly from and are uniformly spaced about the non-vacuum side of the selector plate and contact with the opposing side of the carrier plate. The bumps are of uniform height sufficient to react against the opposing face of the carrier plate and compress where needed to accommodate warpage of the carrier plate and/or the stator and force the selector plate to seal against the stator.

It is therefore an object of the present invention to provide a new and improved vacuum valve that does not require the normal spring to ensure sealing between a stator and selector plate.

Another object is to provide in a vacuum valve a selector plate having projections at its non-vacuum side that react against an opposing face and compress where needed to accommodate warpage in the valve assembly and force the selector plate to seal against a stator.

Another object is to provide in a vacuum valve a selector plate having projections on its non-vacuum side that react against a carrier plate and compress where needed to accommodate warpage of a stator and/or the carrier plate while applying pressure to force the selector plate to seal against the stator.

These and other objects, advantages and features of the present invention will become more apparent from the following description and drawing.

DESCRIPTION OF THE PREFERRED EMBODIMENT

Figure 1:
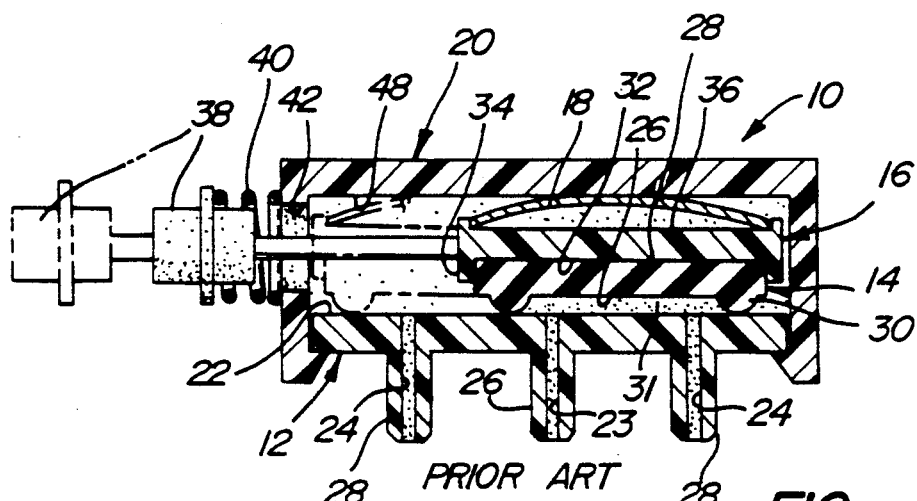
FIG. 1 is a cross-sectional view of a conventional vacuum valve.
Figure 2:
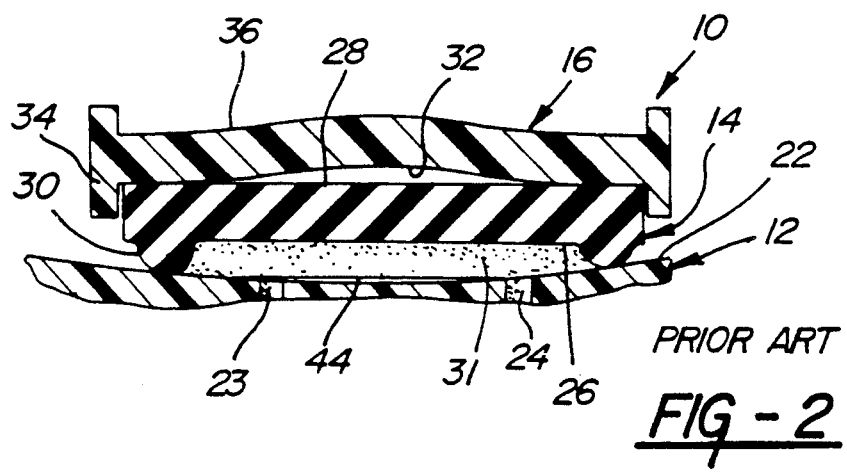
FIG. 2 is an enlarged view of the stator, selector and carrier parts in FIG. 1 illustrating what occurs with warpage of the stator and carrier.

To help understand the present invention, there is shown in FIGS. 1-4 a prior art valve 10 used in a motor vehicle heating, ventilation and air conditioning control system to control vacuum actuated doors in the air ducts. The valve 10 is of the push-button type but could also be of the rotary type as well and comprises a molded plastic stator 12, elastomeric (rubber) selector plate 14, molded plastic carrier 16, metal leaf spring 18 and molded plastic holder 20. The stator has a flat upper surface 22 in which there is formed a vacuum port 23 and one or more communication ports 24 (two being shown). The stator is formed with nipple fittings 26 and 28 that extend from the bottom of the stator and are for connecting the ports 23 and 24 to a vacuum source and servos respectively (not shown). The holder 20 has a rectangular box shape with an open detent provisioned bottom in which the stator 12 snap fits. The selector plate 14 has a rectangular shape with flat bottom and top faces 26 and 28. A bead 30 of uniform heighth extends about the periphery of the selector's bottom face 26 (see FIG. 4) and contacts with the stator's upper surface 22. The selector's top face 28 is normally a plain surface as shown in FIG. 1 and is contacted by a corresponding flat face 32 on the bottom side of the carrier 16. The carrier 16 has a vertically projecting border or rim 34 extending about both its bottom face 32 and a top face 36. The border 34 forms a pocket on the upper and lower side of the carrier that traps the spring 18 and selector plate 14, respectively, for conjoint reciprocal movement therewith by a push-button 38 attached to the carrier and by a spring 40 that returns the carrier and selector plate from the solid to the phantom line position shown in FIG. 1.

Figure 3:
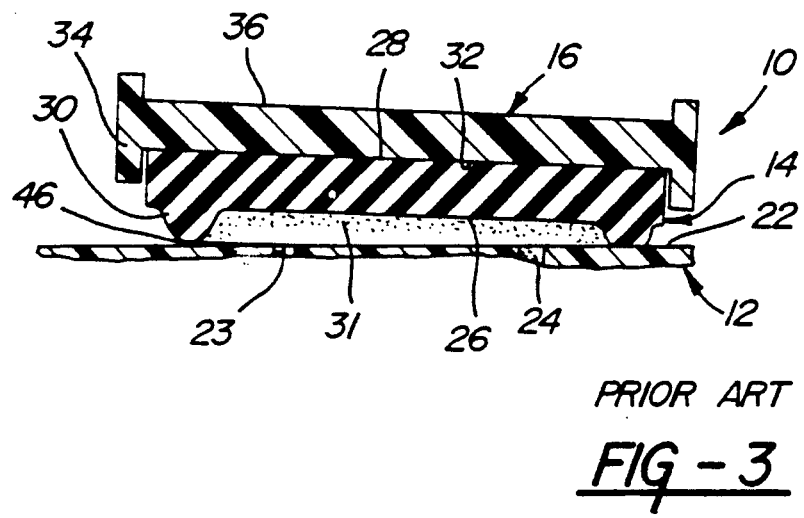
FIG. 3 is a view like FIG. 2 but illustrates what occurs with tilting of the carrier.
Figure 4:
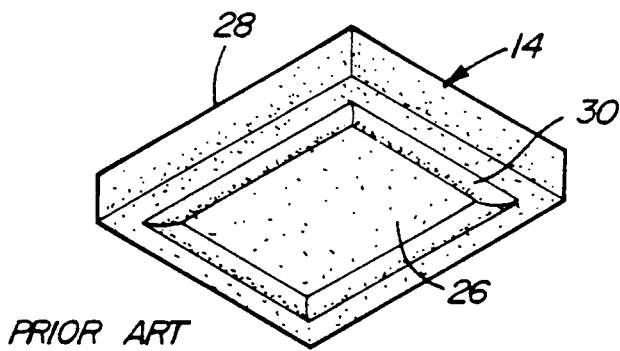
FIG. 4 is a three dimensional view of the underside of the selector plate in FIG. 1.
Figure 5:
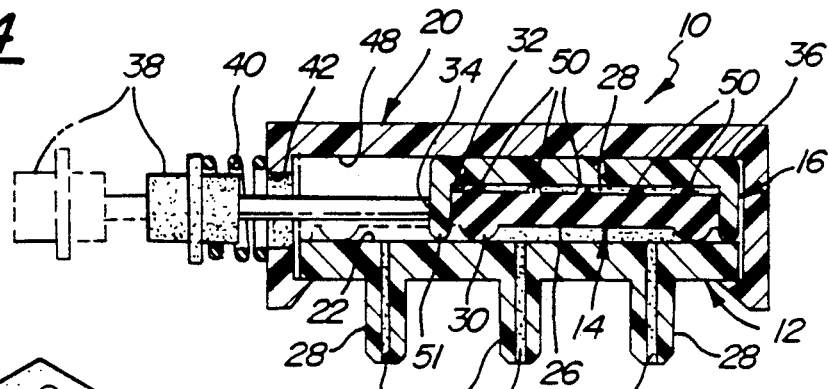
FIG. 5 is a cross-sectional view of the preferred embodiment of the vacuum valve according to the present invention.
Figure 6:
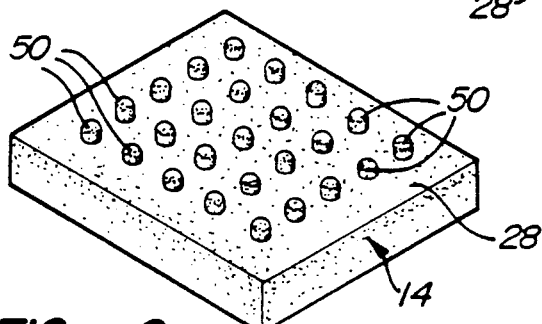
FIG. 6 is a three dimensional view of the topside of the selector plate in FIG. 5.

The bead 30 on the selector plate by its contact with the flat surface of the stator seals vacuum available at the centrally located vacuum port 23 with the aid of the spring 18 and sealing lubricant. In the solid line position shown in FIG. 1, the bead 30 defines a connection or passage 31 between this port and the right-hand communication port 24 while opening the other communication port 24 to vent its connected servo to atmosphere through the push-button access hole 42. When the selector plate is moved leftward by the carrier from the solid to the phantom line position, the bead's line of contact moves to then define a similar connection between the vacuum port 23 and the left-hand communication port 24 while opening the right hand communication port to atmosphere. However, when the carrier and/or the stator are warped (bowed, twisted, etc.) in their molding process, this bead sealing contact may be lost as seen at 44 in FIG. 2. Moreover, the carrier and thereby the selector plate may be tipped by the pushing force on the former causing a leakage path 46 in the valve at one end as shown in FIG. 3. The spring 18 is preloaded between the top 36 of the carrier and the flat underside 48 of the holder so as to compress the sealing bead to offset these problems within certain tolerance ranges without unduly inhibiting carrier movement but becomes restrictive when the warpage exceeds these ranges. Moreover, because of high spring force, the plastic parts are subject to long term creep in a high temperature environment.

Figure 7:
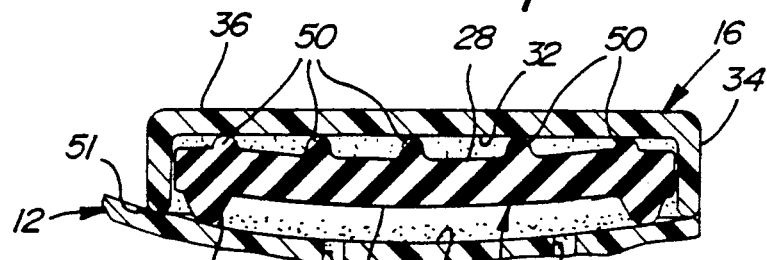
FIG. 7 is an enlarged view of the stator, selector and carrier parts in FIG. 5 illustrating what occurs with warpage of the stator.
Figure 8:
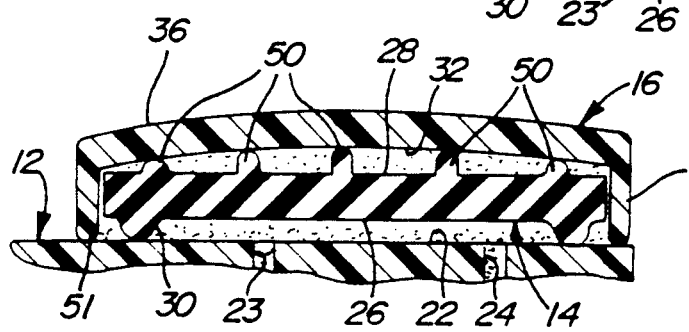
FIG. 8 is an enlarged view like FIG. 7 but illustrating warpage of the carrier.

According to the present invention as shown in FIGS. 5-8 wherein parts similar to those in FIGS. 1-4 are identified by the same reference numbers, the spring 18 is eliminated by the addition of a plurality of compressible projections or bumps 50 of uniform heighth that are formed integral with the selector plate 14 on its upper side and contact at their tips with the carrier's underside 32. And the rim 34 on the carrier 16 is eliminated from the top side 36 and extended downwardly past the selector plate 14 so that the carrier is now directly sandwiched between the holder and stator and slides along the surface 51 of its rim on the latter together with the selector plate. See FIGS. 5 and 6. The projections 50 are uniformly spaced about the formerly plain upper surface 28 of the selector plate and act as springs at a myriad of points independently of each other between the carrier and selector plates to relatively lightly forcibly sandwich the selector plate between the holder and stator. Then if the stator 12 is warped as shown in FIG. 7 and/or the carrier 16 is warped as shown in FIG. 8, the projections 50 are compressed in heighth accordingly to conform to these irregularities so that the bead 30 makes proper full line contact with the stator surface 22. And thus the sealing bead 30 does not need to be compressed as much as with the spring 18 to make up for these irregularities so that the total friction force can be reduced. Furthermore, since the carrier is now directly guided at its surface 36 by the underside 48 of the holder and slides on the stator, tilting of the carrier is positively prevented. Moreover, since the coefficient of friction of the two relatively slidable contacting plastic parts (carrier 16 and stator 12) is much lower than that of the rubber selector plate 14, the friction added by the carrier is minimal. And thus the cost of the valve is reduced by this simplified design while performance is improved.

The foregoing description of the preferred embodiment of the invention has been presented for purposes of illustration and description. It is not intended to be exhaustive or to limit the invention to the precise forms disclosed as obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A self-sealed vacuum valve assembly comprising a molded plastic stator having a flat surface with a vacuum port and at least one communication port, an elastomeric selector plate slidable at one of two oppositely facing flat faces thereof on said flat surface of said stator, said selector plate having a pattern of bead means extending outwardly from and about said one face and contacting with said flat surface of said stator for selectively defining with said flat surface of said stator and said one face of said selector plate a passage between said vacuum port and said one communication port in one mode and alternatively a blockage between said vacuum port and said one communication port and opening of said latter port to atmosphere in another mode by selective sliding of said selector plate relative to said stator, a molded plastic carrier plate disposed at one of two oppositely facing flat faces thereof opposite the other face of said selector plate, said carrier and selector plates having cooperating engaging means for causing said selector plate to move conjointly with said carrier plate and relative to said stator to effect said modes, said carrier plate further having a flat surface in contact with the flat surface of said stator so as to be slidable thereon, holder means for holding said selector and carrier plates on said stator, said holder means having a flat face contacting with the other face of said carrier plate, and a plurality of discrete compressible bumps extending outwardly from and spaced about said other surface of said selector plate for cooperating with said holder means to forcibly sandwich said carrier plate and selector plate between the holder means and the stator so that said bumps each contact at a terminal end thereof with the other of these surfaces and conform therewith, when said stator and/or said carrier plate are warped, by a compensating height reduction of said bumps caused by compression of said bumps from said sandwiching force to thereby maintain sealing contact between said bead means and said surface of said stator when there occurs warpage of said carrier plate and/or said stator.

2. A self-sealed vacuum valve assembly comprising a molded plastic stator having a flat surface with a vacuum port and at least one communication port, an elastomeric selector plate slidable at one of two oppositely facing flat faces thereof on said flat surface of said stator, said selector plate having a pattern of bead means extending outwardly from and about said one face and contacting with said flat surface of said stator for selectively defining with said flat surface of said stator and said one face of said selector plate a passage between said vacuum port and said one communication port in one mode and alternatively a blockage between said vacuum port and said one communication port and opening of said latter port to atmosphere in another mode by selective sliding of said selector plate relative to said stator, a molded plastic carrier plate disposed at one of two oppositely facing flat faces thereof opposite the other face of said selector plate, said carrier plate having a border about its said one flat face for capturing said selector plate for movement therewith relative to said stator to effect said modes, said border contacting the flat surface of said stator for sliding movement thereon, holder means for holding said selector and carrier plates on said stator, said holder means having a flat face contacting with the other face of said carrier plate, and a plurality of discrete compressible bumps of uniform height extending outwardly from and uniformly spaced about said other surface of said selector plate for cooperating with said holder means to forcibly sandwich said carrier plate and selector plate between the holder means and the stator so that said bumps each contact at a terminal end thereof with the other of these surfaces and conform therewith, when said stator and/or said carrier plate are warped, by a compensating height reduction of said bumps caused by compression of said bumps from said sandwiching force to thereby maintain sealing contact between said bead means and said surface of said stator when there occurs warpage of said carrier plate and/or said stator.

3. A self-sealed vacuum valve assembly comprising a molded plastic stator having a flat surface with a vacuum port and at least one communication port, an elastomeric selector plate slidable at one of two oppositely facing flat faces thereof on said flat surface of said stator, said selector plate having a pattern of bead means extending outwardly from and about said one face and contacting with said flat surface of said stator for selectively defining with said flat surface of said stator and said one face of said selector plate a passage between said vacuum port and said one communication port in one mode and alternatively a blockage between said vacuum port and said one communication port and opening of said latter port to atmosphere in another mode by selective sliding of said selector plate relative to said stator, a molded plastic carrier plate disposed at one of two oppositely facing flat faces thereof opposite the other face of said selector plate, said carrier plate having a border for capturing said selector plate so as to cause the latter to move conjointly therewith relative to said stator to effect said modes, said border having a surface extending completely therealong contacting the flat surface of said stator for sliding movement thereon, holder means for holding said selector and carrier plates on said stator, said holder means having a flat face contacting with the other face of said carrier plate, and a plurality of discrete compressible bumps of uniform height extending outwardly from and uniformly spaced about said other surface of said selector plate for cooperating with said holder means to forcibly sandwich said carrier plate and selector plate between the holder means and the stator so that said bumps each contact at a terminal end thereof with the other of these surfaces and conform therewith, when said stator and/or said carrier plate are warped, by a compensating height reduction of said bumps caused by compression of said bumps from said sandwiching force to thereby maintain sealing contact between said bead means and said surface of said stator when there occurs warpage of said carrier plate and/or said stator.

* * * * *